United States Patent [19]

Zhuang et al.

[11] Patent Number: 5,793,840
[45] Date of Patent: Aug. 11, 1998

[54] METHOD OF SENDING A MESSAGE THROUGH A PHONE SYSTEM BY TURNING ON A COMPUTER

[76] Inventors: Min Zhuang; Zong-Pei Jin, both of 7196 157th St. W., Apple Valley, Minn. 55124

[21] Appl. No.: 297,966

[22] Filed: Aug. 30, 1994

[51] Int. Cl.[6] .................................................. H04M 11/04
[52] U.S. Cl. ............................ 379/47; 379/41; 379/51
[58] Field of Search ............................ 379/37–51, 90,
379/93, 88, 104, 102, 106; 340/506, 825.06;
364/131, 141, 132, 188, 900, 200, 510,
184, 185, 138; 395/750, 186, 187.01, 188.01

[56] References Cited

U.S. PATENT DOCUMENTS

| | | | |
|---|---|---|---|
| 4,622,538 | 11/1986 | Whynacht et al. | 340/506 |
| 4,716,582 | 12/1987 | Blanchard et al. | 379/50 |
| 4,782,451 | 11/1988 | Mazzarella et al. | 364/510 |
| 4,809,163 | 2/1989 | Hirosawa et al. | 364/200 |
| 4,872,195 | 10/1989 | Leonard | 379/41 |
| 4,922,450 | 5/1990 | Rose et al. | 364/900 |
| 4,996,707 | 2/1991 | O'Malley et al. | 379/88 |
| 5,065,427 | 11/1991 | Godbole | 379/98 |
| 5,086,385 | 2/1992 | Launey et al. | 379/102 |
| 5,119,412 | 6/1992 | Attallah | 379/104 |
| 5,283,638 | 2/1994 | Engberg et al. | 379/90 |
| 5,414,860 | 5/1995 | Canova, Jr. et al. | 395/750 |
| 5,428,671 | 6/1995 | Dykes et al. | 379/97 |
| 5,430,867 | 7/1995 | Gunjii | 395/188.01 |

*Primary Examiner*—Jason Chan

[57] ABSTRACT

A method of sending an alarm message through a phone system by turning on a computer having memory, an operating system, a computer program, and a modem. The method involves building the alarm message and sending it through the phone system by using the computer program. The computer's electric power is triggered by a person, a security device, or any other device that can turn on a computer.

2 Claims, 1 Drawing Sheet

METHOD OF SENDING A MESSAGE THROUGH A PHONE SYSTEM BY TURNING ON A COMPUTER

BACKGROUND OF THE INVENTION

1. Field of the Invention

This invention is a new way of sending alarm phone messages by turning on a computer. More specifically, the present invention relates to computer security systems, office security systems, and home security systems.

2. Description of Related Arts

In a security system, the standard method of sending alarm phone message is by using an automatic message dialer which is triggered by a specially designed security device. This method had and still has significant limitations. The dialer is a dedicated hardware device with very basic functions and little processing capability. Usually, it can dial 3 or 4 phone numbers and send voice messages only.

As more than 120 million personal computers are in use today and personal computers become less expensive each year, we can expect that almost all the companies will have computers in their offices and most families will have computers in their homes. Many of these computers have modem to facilitate networking and data communications. So that computer owners can use existing equipment with advanced computer technology to protect their computers from unauthorized computer users and their offices and homes from security problems. Further, the computer central processing unit has very powerful processing capabilities that are far superior to that of any security hardware device. We can expect that using a computer will be the method of choice to meet desired protection. When a security problem occurs, the computer can be turned on by a person, or a security device with a power control module, such as motion detector, door/window sensor, smoke detector, flood sensor, panic button, etc. Hence a method of sending alarm phone messages by turning on a computer, that requires no additional hardware for the computer with a modem, will be very advantageous.

OBJECTS OF THE INVENTION

Accordingly, several objects or advantages of my invention are:

(a) to provide a method of sending alarm messages through a phone system by turning on a computer, which method uses the most advanced features of computer software and hardware;

(b) to provide a method of sending alarm sound signals as well as FAX messages, computer data messages, E-Mail, voice messages, and other format alarm messages, through a phone system;

(c) to provide a method of preventing unauthorized computer users from entering a computer system;

(d) to provide a universal interface to any devices with a power control module which can turn on a computer;

(e) to provide a method of saving electricity by turning on the computer just before sending alarm messages.

(f) to eliminate a dedicated hardware device, automatic message dialer; and (g) to provide a software solution for security systems by using existing computer hardware.

Still further objects and advantages will become apparent from a consideration the ensuing description and drawings of this invention.

REFERENCE NUMERALS IN DRAWINGS

Figure 1:
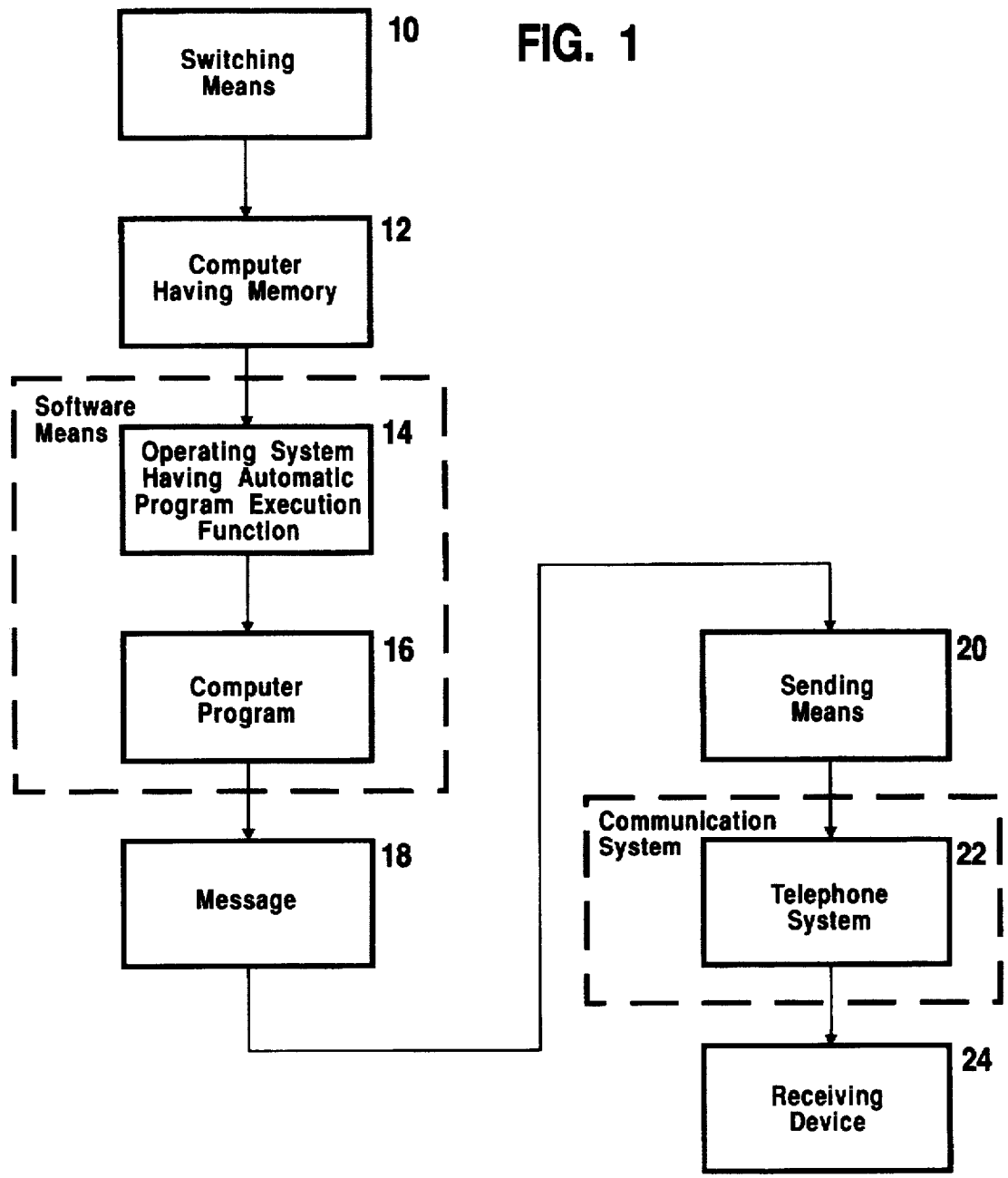
FIG. 1 of the drawing illustrates a flowchart of the method.

| | |
|---|---|
| 10 | Switching Means |
| 12 | Computer Having Memory |
| 14 | Operating System Having Automatic Program Execution Function |
| 16 | Computer Program |
| 18 | Message |
| 20 | Sending Means |
| 22 | Telephone System |
| 24 | Receiving Device |

DESCRIPTION OF THE PREFERRED EMBODIMENT

Refer now to FIG. 1, which is a flowchart of a preferred embodiment of the invention. This embodiment utilizes the following computer equipment and telephone equipment which are available commercially from Packard Bell, Thousand Oaks, Calif. and AT&T.

Computer having memory 12, operating system having an automatic program execution function 14, and sending means (modem) 20, are the Packard Bell Legend 20CD IBM compatible personal computer with PB24DBFV Modem Fax SIR/V and IBM Disk Operating System (DOS).

Telephone system 22 is the public telephone system.

Receiving device 24 is an AT&T telephone.

The preferred embodiment also utilizes a computer program 16 which was written in C language compiled by using Borland International's Turbo C compiler version 1.5. This program was designed to be run under DOS and named "SecurityProg" which can build and send a message 18. A complete listing of the source code is set forth in the attached Appendix.

Switching means 10 can be an unauthorized computer user, a person who wants to use the computer to send messages, a security device with a power control switch, such as Radio Shack's 61-2684A 3 prong universal appliance switch.

Every time an IBM PC with DOS is turned on, a batch program named "autoexec.bat" is always executed automatically to perform the automatic program execution function. Because security functions must be carried out as soon as a problem is being detected, the SecurityProg program should be the very first job run by the autoexec.bat.

SecurityProg operates to carry out the following 6 functions:

1. Define control switch value;
2. Define phone number to dial, communication port number, password, and personal ID number;
3. Open communication port;
4. Convert personal ID number into a series of sound signals to built alarm message;
5. Read user password; and
6. Dial phone number and send alarm message.

1. Define control switch value.

The data portion of the program contains a control switch. A character 'Y' means to perform security functions and a 'N' means to skip all the security functions.

2. Define phone number to dial, communication port number, password and personal ID number.

The telephone number, communication port number, password and personal ID number are defined in the data section. IBM names the IBM PC communication ports as "COM1", "CONM2", and so forth. The communication port number is the port number which connects a modem. The user ID number is set for the person who answers phone to identify the source of the alarm.

3. Open communication port.

The SecurityProg program uses factory default values to set up communication port and opens it for communication. If the port is opened successfully, SecurityProg will continue to perform the rest of the functions.

4. Convert personal ID number into a series of sound signals to build alarm message.

Most modems on the market use the Hayes Standard AT Command Set and have a 40-character long command buffer. According to the Hayes Standard AT Command Set, dialing a modifier '@' is to instruct the modem to listen for quiet answer, about 5 seconds, before continuing; dialing a modifier ',' is to delay processing for few seconds, determined by register S8 value. The default value of the register S8 is 2 seconds.

By using pulse or tone dialing, the modem can send a clear sound signal "da" by dialing a '1' after the modifier '@'. One method to convert a digit to sound signal is to dial that number of '1's. for example, digit 5 can be converted to '11111'. If the modem dials '11111', the person who answers phone will hear "da da da da da". The modifier ',' can be used between digits to let the person clearly identify each digit.

SecurityProg has a procedure which converts a single numeric digit into a character string of number of '1's then appends it to the command buffer. Since the length of the command buffer is limited, SecurityProg has two limitations for the personal ID number. One limitation is that the length of a valid personal ID is 3 digits and another limitation is that a valid personal ID consists of digit 1, 2, 3, 4, or 5 only. For example, 355 is a valid personal ID number; 120 is NOT valid because it contains an invalid digit 0; 3445 is NOT valid because the length of the ID number is greater than 3. Here is a sample command to send a personal ID 435 as a message:

ATDP 4323633 @3, 1111, 111, 11111 CR

In the above example, SecurityProg sends a command to let the modem do the following functions:

| ATDP 4323633 | Pulse dial phone number 432-3633; |
|---|---|
| @ | Wait for 5 seconds quiet answer; |
| 3 | Dial a 3. It creates a fast "dadada" sound signal to indicate the personal ID number will follow; |
| , | Wait for 2 seconds; |
| 1 1 1 1 | Create a slow "da da da da" sound signal to stand for the digit 4; |
| , | Wait for 2 seconds; |
| 1 1 1 | Create a slow "da da da" sound signal to stand for the digit 3; |
| , | Wait for 2 seconds; |
| 1 1 1 1 1 | Create a slow "da da da da da" sound signal to stand for the digit 5; |
| CR | Carriage Return; |

5. Read user password

SecurityProg waits password for a few seconds, if owner enters the correct password within this time period to disarm the security function, SecurityProg will stop. This feature is useful when the owner wants to disarm the security functions and resume the normal computer functions.

If an incorrect password is entered, or a Control-Break is entered to attempt interrupting the program by the unauthorized computer user, or the waiting period is over (that is, the computer is turned on by a device or the user has not typed in any password), SecurityProg will send the alarm message immediately.

After the alarm message is sent, SecurityProg will continue in the arm mode until a correct password is entered. This function is designed to protect prevent the unauthorized computer user from further interfering the computer system.

6. Dial phone number and send alarm message

Once an incorrect password is entered, or a Control-Break is entered, or the waiting period is over, SecurityProg sends the command to the modem for sending the alarm message. The person who answers the phone should wait on the line for 5 seconds quiet answer and begin to count the personal ID number after hearing a fast "dadada" attention sound signal.

SUMMARY, RAMIFICATIONS, AND SCOPE

Accordingly, the reader will see that this invention provides a new method to send an alarm message through a phone system by turning on a computer; which is simple to install and use; which is inexpensive to maintain and easy to expend; which does not require a hard disk drive; and which can be virtually used on any computers with a modem. Furthermore, the invention has additional advantage in that it uses the most advanced features of the fast growing computer software and hardware technology;

it provides a method of sending alarm sound signals as well as FAX messages, computer data messages, E-Mail, voice messages, and other format alarm messages, through a phone system;

it provides a method of preventing unauthorized computer users from entering a computer system;

it provides a universal interface to any devices with a power control module which can turn on a computer;

it provides a method of saving electricity by turning on the computer just before sending a message;

it eliminates a dedicated hardware device, automatic message dialer; and it provides a software solution for security systems by using existing computer hardware.

Although the description above contains many specifications, these should not be construed as limiting the scope of the invention but as merely providing illustrations of some of the presently preferred embodiments of this invention. For example, the message can be in different format, such as FAX, E-Mail, voice, computer data, etc.; the receiving device can be a FAX machine, a computer, or other communication devices; the computer program can be programmed to instruct the modem to dial multiple locations and send different format messages; or the computer program can repeatedly send message in case of busy signal or error detected.

Thus the scope of the invention should be determined by the appended claims and their legal equivalents, rather than by the examples given.

APPENDIX

```
/*
***********************************************************     *
 *                                                               *
 * Program: SecurityProg                                         *
 * Author: Min Zhuang                                            *
```

-continued

APPENDIX

```
* Copy Right 1994. All Rights Reserved              *
*                                                   *
* Date      Reason                                  *
*---------------------------------------------------*
* 05/28/1994 Initially created                      *
* 06/03/1994 Added routines to                      *
*            perform personal ID                    *
*            logic                                  *
* 08/20/1994 Added routines to                      *
*            process Control-Break                  *
*                                                   *
*****************************************************
```

This program should be included in autoexec.bat as the first program to be run when the computer is turned on.

SecurityProg was designed to response the following conditions:

A. The computer is turned on by an unauthorized user

SecurityProg will display a warning message and ask the person to enter a password to disarm the security function. If the person enters an incorrect password, or enters Control-Break to abort the program, or the waiting period is over, SecurityProg will send an alarm message immediately and stay in the arm mode until a correct password is entered.

B. The computer is turned on by a security device

In this case, no password will be entered. When the waiting period is over, SecurityProg will send alarm message. #include<stdio.h>#include<conio.h>#include<bios.h>#include<dos.h>#include<string.h>#include<ctype.h>

```
/*************************************/
/*                                   */
/* Global Variables                  */
/*                                   */
/*************************************/
#define CR 0x0D /* Carriage Return */
#define LF 0x0A /* Line Feed */
#define BS 0x08 /* Back Space */
char control_switch='Y'; /* control switch */
```

The length of a valid personal ID number is 3 digits and it consists of digit 1,2,3,4, or 5 only. For example, 335 is a valid ID number, 120 is NOT valid because it contains an invalid digit 0; 3445 is NOT valid because the length of the ID number is greater than 3.

```
int person_id=435;     /* personal ID number */
/*
Command Line Detail:
AT          Command line prefix(ATtention)
M0          Turn speaker off
DP          Pulse dial
@           instruct the modem to listen for five seconds of silence
            before continuing.
,           Delay processing of next character
*/
char *command="ATDP";
char *phone_number="4323633";
char *wait_for_silence="@3,";
char *password="test";    /* password to disarm the system.
                             Maximum length is 8*/
char alarm_switch='Y';    /* sending alarm message switch */
char arm_switch='Y';      /* arm switch */
char buffer[40];          /* Command buffer */
int timer=32000;          /* define the waiting period */
FILE *fp;                 /* File pointer for communication port */
char port[]="COM1";       /* Set communication port to COM1 */
/*************************************/
```

```
/*                                              */
/* Procedure append                             */
/*                                              */
/************************************************/
/*                                              */
/* Convert a digit to a string of '1's          */
/* and append it to the command buffer          */
/*                                              */
/************************************************/
append(char *buf,int digit)
{
int error_sw=0;
switch(digit)
{
case 1:
    strcat(buf,"1");
    break;
case 2:
    strcat(buf,"11");
    break;
case 3:
    strcat(buf,"111");
    break;
case 4:
    strcat(buf,"1111");
    break;
case 5:
    strcat(buf,"11111");
    break;
default:
    error_sw=1;
    break;
}
return error_sw;
}
/************************************************/
/*                                              */
/* procedure build_dial_string                  */
/*                                              */
/************************************************/
/*                                              */
/* Build dialing string with personal ID number */
/*                                              */
/************************************************/
int build_dial_string()
{
int length;
int id,id_digit;
int error_sw=0;
strcpy(buffer,command);
strcat(buffer,phone_number);
strcat(buffer,wait_for_silence);
if(person_id>555||person_id<111)
{
    printf("Invalid Personal ID, program aborted\n");
    error_sw=1;
    return(error_sw);
}
id=person_id;
id_digit=id/100;
id=id%100;
if (append(buffer,id_digit)==0)
    strcat(buffer,",");
else
{
    printf("Invalid Personal ID, program aborted\n");
    error_sw=1;
    return(error_sw);
}
id_digit=id/10;
id=id%10;
if (append(buffer,id_digit)==0)
    strcat(buffer,",");
else
{
    printf("Invalid Personal ID, program aborted\n");
    error_sw=1;
    return(error_sw);
}
if(append(buffer,id)!=0)
```

```
{
printf("Invalid Personal ID, program aborted\n");
error_sw=1;
return(error_sw);
}
length=strlen(buffer);
if (length>38)
{
error_sw=1;
printf("Invalid command length\n");
}
else
{
buffer[length]=CR;
buffer[length+1]='\0';
}
return error_sw;
}
/************************************************/
/*                                              */
/* procedure    SendAlarm                       */
/*                                              */
/************************************************/
/*                                              */
/* Check password, set timer,                   */
/* dial phone number and send alarm sound signal */
/*                                              */
/************************************************/
SendAlarm()
{
int i,j,c,x,y;
char user_input[20];
char set_timer;
int pass_length;
pass_length=strlen(password);
if (pass_length>8||pass_length<1)
{
printf("Invalid password length\n");
return;
}
user_input[0]='\0';
if ((fp=fopen(port,"w"))!=NULL)
{
if (build_dial_string()==0)
{
clrscr();
x=1;
y=3;
printf("This computer is protected by SecurityProg.\n");
printf("Please enter your password to disarm the system:\n");
gotoxy(x,y);
while(arm_switch=='Y')
{
i=0;
j=0;
set_timer='Y';
while (set_timer=='Y')   /* set a timer and wating for input */
{
if (kbhit())
{
user_input[j]=getch();
if (user_input[j]==BS)  /* back space entered */
{
user_input[j]=' ';
if(j>0)j--;
if(x>1)
{
x=x-1;
gotoxy(x,y);
putch(' ');
gotoxy(x,y);
}
}
else
{                      /* character entered */
putch('*');
x=x+1;
gotoxy(x,y);
if (user_input[j]==LF||user_input[j]==CR)
    set_timer='N';     /* Line Feed or Carriage Return entered */
```

```
else
{
j++;
if j==pass_length)
    set_timer='N';     /* password length reached */
}
}
else
{
i++;
if (i>timer)           /* timer is over */
    set_timer='N';
}
}
user_input[j]='\0';
if (strcmp(user_input,password)!=0)
{
if (alarm_switch=='Y')
{
alarm_switch='N';
fprintf(fp,buffer);    /* dial phone number and send alarm sound signal */
}
}
else
arm_switch='N';
}
}
}
/************************************************/
/*                                              */
/* procedure    Control_break                   */
/*                                              */
/************************************************/
/*                                              */
/* If an unauthorized user pressed the          */
/* Control-Break key to abort the program,      */
/* send alarm message immediately.              */
/*                                              */
/************************************************/
int control_break()
{
if (alarm_switch=='Y')
{
alarm_switch='N';
fprintf(fp,buffer);    /* dial phone number and send alarm sound signal */
}
}
/************************************************/
/*                                              */
/* MainProgram                                  */
/*                                              */
/************************************************/
/*                                              */
/* SecurityProg main program                    */
/*                                              */
/************************************************/
main()
{
if (control_switch=='Y')
{
ctrlbrk(control_break);  /* processing the Control-Break message */
SendAlarm();
}
}
```

What is claimed is:

1. A method of sending a message through a communication system to a receiving device triggered by switching means for turning on a computer having a memory, software means for requesting a user to enter a password during a predetermined waiting period and sending said message by using said switching means as a trigger in the event that said password is incorrectly entered or said password has not been entered when said predetermined waiting period is over, and sending means having a modem with a wait-for-quiet-answer feature for transmitting said message, said method comprising the steps of:

(a) turning on said computer by said switching means executing said software means in said memory;

(b) requesting said user to enter said password during said predetermined waiting period by said software means; and (c) in the event that said password is incorrectly entered or said password has not been entered when said predetermined waiting period is over, converting a predetermined numeric value by said software means into a dial string in a format for making a receiving person directly understand said predetermined numeric value; and sending said message by dialing said dial string using said sending means having said modem with said wait-for-quiet-answer feature for generating signals of said predetermined numeric value as part of said message through said communication system to said receiving device by said software means using said switching means as said trigger, wherein said converting step further comprising the additional step of converting a digit into a string of '1's with the string length equals said digit's numeric value as part of said dial string to generate the sound signals in said receiving device having a telephone for making said receiving person understand the numeric value of said digit by counting the number of sound signals.

2. The method defined in claim 1, wherein said message is an alarm message.

* * * * *